No. 891,307. PATENTED JUNE 23, 1908.
T. WALSH.
MEAT HANGER.
APPLICATION FILED MAR. 30, 1906.
2 SHEETS—SHEET 1.
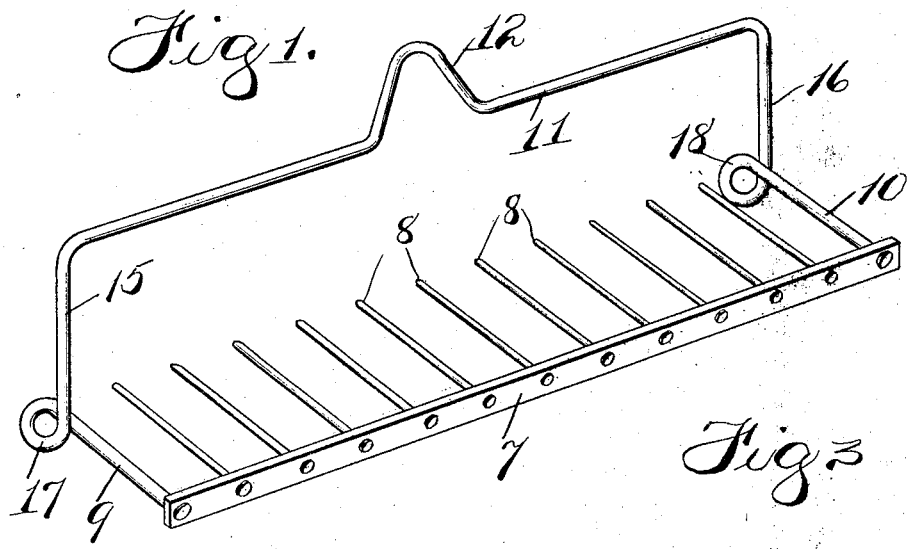
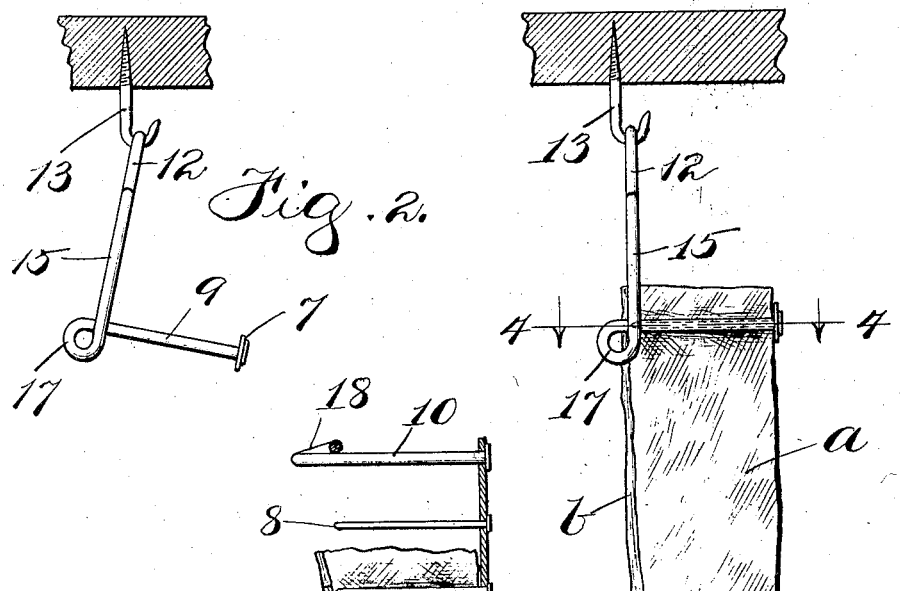
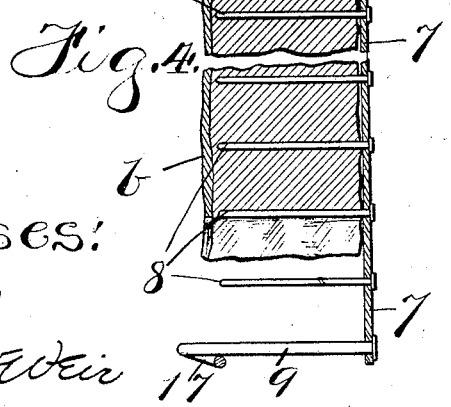
Witnesses:
J. B. Weir
Robert H. Weir
Inventor:
Thomas Walsh,
by Bond Adams Pickard & Jackson
his Attys.

No. 891,307. PATENTED JUNE 23, 1908.
T. WALSH.
MEAT HANGER.
APPLICATION FILED MAR. 30, 1906.
2 SHEETS—SHEET 2.
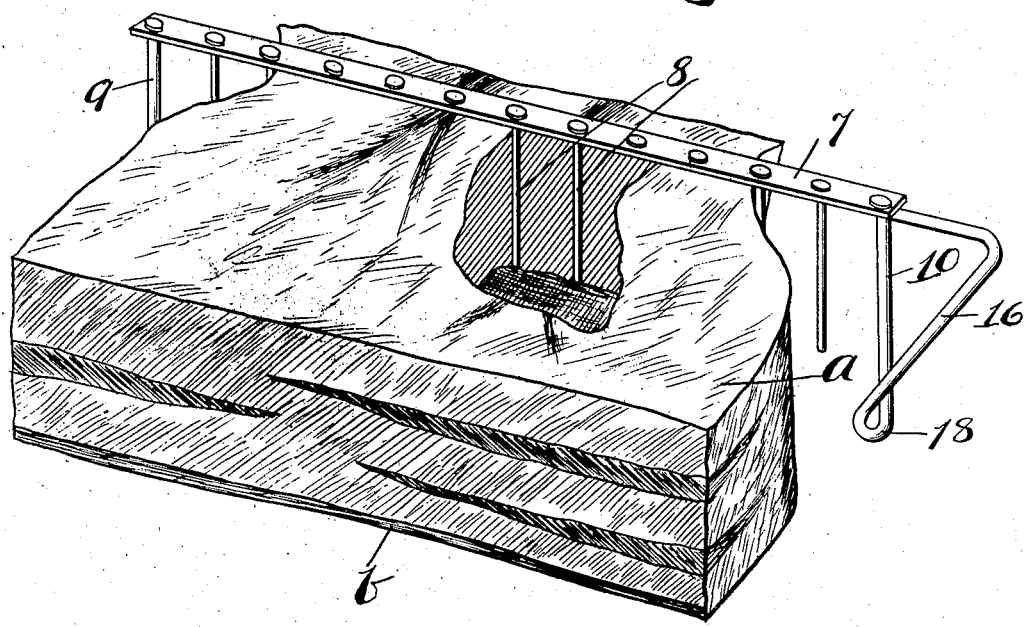
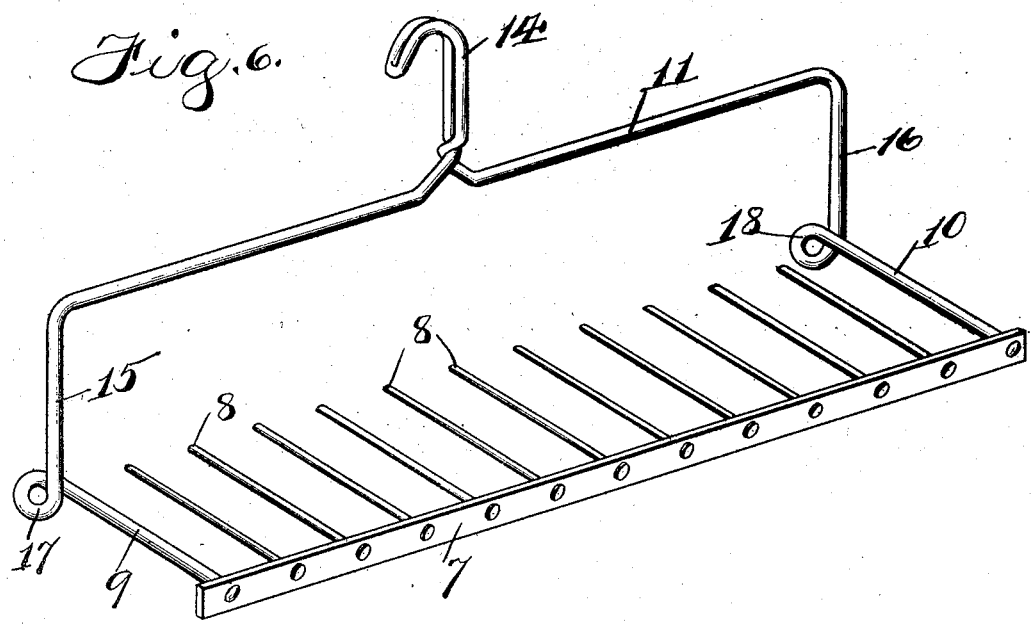
Witnesses:
J. B. Weir
Robert H. Weir
Inventor:
Thomas Walsh,
by Bond Armstrong & Jackson
his Attys.

UNITED STATES PATENT OFFICE.

THOMAS WALSH, OF CHICAGO, ILLINOIS, ASSIGNOR TO SWIFT AND COMPANY, OF CHICAGO, ILLINOIS, A CORPORATION OF ILLINOIS.

MEAT-HANGER.

No. 891,307.  Specification of Letters Patent.  Patented June 23, 1908.

Application filed March 30, 1906. Serial No. 308,900.

*To all whom it may concern:*

Be it known that I, THOMAS WALSH, a citizen of the United States, residing at Chicago, in the county of Cook and State of Illinois, have invented certain new and useful Improvements in Meat-Hangers, of which the following is a specification, reference being had to the accompanying drawings.

My invention relates to apparatus used for suspending meats during their treatment in the manufacture of bacon and analogous products, and it has for its object to provide a new and improved hanger which may readily be applied to the meat, and which will properly suspend it during the subsequent steps in its treatment.

More particularly it is my object to provide a meat hanger suitable for use in carrying out the method which forms the subject-matter of my application of even date herewith.

In the manufacture of bacon the meat after being subjected to the usual preliminary steps is smoked, or otherwise cured, and during the smoking operation is suitably suspended so that all parts are subjected to the action of the smoke.

Heretofore much difficulty has been encountered in devising a suitable hanger for suspending the meat during the smoking operation,—the available devices being objectionable for the reason that by their use it has been difficult to control with certainty the shape of the product after smoking. It is recognized in the trade that it is highly desirable from a commercial point of view to market the bacon or other analogous meats in uniform and symmetrical shaped packages, but with the devices heretofore employed the meat when cured has been more or less irregular, which has made it necessary to do a considerable amount of trimming, with a consequent substantial loss.

To avoid the necessity of trimming the meat after smoking by controlling in advance the shape of the finished product is the object of my said application hereinbefore referred to, while my present application has to do with a hanger particularly adapted for use in carrying out my said method. The method referred to consists, generally speaking, in laterally contracting the meat at one end-portion of the piece and applying to the contracted portion a device arranged to maintain the meat in its contracted condition,—the idea being to compensate in advance for the shrinkage of the remainder of the piece. That is to say, the part to which the hanger is applied is puckered or shrunk in advance, while the remainder of the piece is permitted to shrink naturally during the curing operation. The puckered part, of course, shrinks during the curing operation, but owing to the puckering this is not interfered with by the engagement therewith of the suspending device. The final result is that all the parts in the piece shrink uniformly, and the final product retains its original symmetrical shape. Furthermore, I avoid objectionable puncturing of the rind by applying the hanger to the flesh side of the piece.

In the accompanying drawings I have illustrated my improved apparatus as employed in the carrying out of my improved process or method above referred to, but I wish it to be understood that my present invention is not restricted to use in carrying out such process, as it may be used wholly independently thereof.

In the accompanying drawings,—Figure 1 is a perspective view of my improved hanger; Fig. 2 is a view, partly in section, illustrating the hanger suspended without a load; Fig. 3 is a similar view, showing the condition of the hanger with a piece of meat attached thereto; Fig. 4 is a horizontal section on line 4—4 of Fig. 3; Fig. 5 is a perspective view, some parts being broken away, illustrating the use of my improved hanger in carrying out the process hereinbefore referred to; and Fig. 6 is a perspective view, showing a modification.

As shown in Fig. 1, my improved hanger comprises a transverse bar 7 having secured thereto a series of teeth or pins 8 which project therefrom at one side,—preferably all of said teeth or pins being in the same plane. Said teeth are perpendicular to the bar 7, as shown in Fig. 2. Their points are sharp enough to penetrate the flesh *a* of the piece as distinguished from the rind *b*, but not to penetrate the rind, except under extraordinary pressure, so that as the teeth are pressed into the meat by the operator ordinary pressure will cause them to enter the flesh only.

The bar 7 is connected with the ends 9—10 of a rod 11 which is in the form of a bail, as shown in Figs. 1 and 6. In the construction shown in Fig. 1 the intermediate portion of the rod 11 is bent upward to form an offset portion 12 adapted to engage a supporting device, such as the hook 13; while in Fig. 6 I have shown the intermediate portion of the rod 11 as having a hook 13 preferably formed by properly bending said rod. As best shown in Fig. 1, the ends 9—10 of the bail 11 lie in a plane perpendicular to the plane of the intermediate portion of the bail 11, by which I mean the plane of the horizontal portion thereof and the adjacent vertical portions 15—16 thereof. The ends 9—10 are substantially in the plane of the teeth 8, as shown, and the points of the teeth are substantially in the plane of the end portions 15—16, as shown in dotted lines in Fig. 3. It will thus be seen that the bar 7 is at one side of the intermediate portion of the bail and consequently when the hanger is suspended without a load it occupies the position shown in Fig. 2,—the teeth 8 being inclined slightly upward from the bar 7. When, however, the hanger is in use, the weight of the meat causes the intermediate portion of the hanger to assume a substantially vertical position, as shown in Fig. 3. The tipping downward of the teeth or pins is thus avoided and the retention of the meat on the teeth assured. As also shown in Figs. 1, 2 and 3, loops 17—18 are formed at the intersection of the end portions 9—10 with the vertical portions 15—16, thereby increasing the resiliency of the hanger. It will be understood that the teeth and preferably all parts of the hanger are tinned, or otherwise suitably coated, to protect them from the corroding action of the meat juices.

In use the hanger is applied by pressing its teeth or pins into the flesh side of the piece of meat near one end thereof, so that the bail projects beyond the end of the piece,—the bar 7 extending transversely thereof. Where my improved process is employed the sides of the meat are pressed together so as to pucker the meat to such an extent as to compensate for its probable shrinkage, and while so puckered the teeth are pressed into it,—the rind, however, not being punctured. The meat is then hung in the smokehouse, or other curing chamber, until finished.

I have used the term "bail" to designate the connection by which the teeth or the tooth-carrying bar are suspended from the hook or other support, but it is to be understood that that term is used in a generic sense to identify such connection regardless of its specific shape, as except in so far as specifically claimed I do not limit myself to making the suspending device of the shape of a bail or to securing its ends to the ends of the bar or other tooth support. The arrangement of the parts of the hanger so that the tooth-supporting bar is outside the plane of the suspending device, by which I mean the vertical, or substantially vertical, plane in which the suspending device normally hangs pendent, and causing the teeth to project toward the plane of the bail so that the point of suspension of the hanger lies more or less nearly over the points of the teeth and the non-rotatable connection of the teeth or the tooth support with the suspending device are important features of my invention and are also claimed broadly.

That which I claim as my invention and desire to secure by Letters Patent is,—

1. A meat-hanger, comprising a suspending device, a bar outside the plane thereof and non-rotatably connected therewith, and teeth carried by said bar in a plane substantially perpendicular to and projecting toward the plane of suspension of the suspending device.

2. A meat-hanger, comprising a bail, a tooth-supporting bar arranged at one side of and parallel with the plane of suspension of the bail, said bar being connected with said bail, and teeth carried by said bar and projecting toward the plane of suspension of the bail.

3. A meat-hanger, comprising a bail having its ends bent to form loops arranged at an angle with the intermediate portion of the bail, and a bar non-rotatably connected with the ends of the bail, said bar having a series of teeth projecting toward and terminating at substantially the vertical plane of the bail.

4. A meat-hanger, comprising a bail, a bar outside the plane thereof and non-rotatably connected therewith, and teeth carried by said bar in a plane substantially perpendicular to and projecting toward the vertical plane of the bail.

THOMAS WALSH.

Witnesses:
    I. O. BEATTY,
    BEN F. TAIT.